United States Patent [19]

Bearden, Jr. et al.

[11] 4,295,995
[45] Oct. 20, 1981

[54] CATALYSTS HYDROCARBON TREATING PROCESSES

[75] Inventors: Roby Bearden, Jr.; Clyde L. Aldridge, both of Baton Rouge, La.

[73] Assignee: Exxon Research & Engineering Co., Florham Park, N.J.

[21] Appl. No.: 90,415

[22] Filed: Nov. 1, 1979

Related U.S. Application Data

[63] Continuation-in-part of Ser. No. 955,526, Oct. 30, 1978, which is a continuation-in-part of Ser. No. 847,898, Nov. 2, 1977, Pat. No. 4,134,825.

[51] Int. Cl.³ .................... B01J 23/84; B01J 23/85; B01J 27/04; B01J 31/12
[52] U.S. Cl. .................... 252/431 C; 252/431 N; 252/431 P; 252/439; 252/463; 252/464; 252/465; 252/466 J; 252/466 PT; 252/470; 252/471; 252/472; 252/475; 252/476

[58] Field of Search ........... 252/431 C, 431 N, 431 P, 252/439, 463, 464, 465, 466 J, 466 PT, 470, 471, 472, 475, 476

[56] References Cited

U.S. PATENT DOCUMENTS

| | | | |
|---|---|---|---|
| 1,876,270 | 9/1932 | Zorn | 252/431 R |
| 2,091,831 | 8/1937 | Pongratz et al. | 208/108 |
| 3,052,739 | 9/1962 | Hummers | 585/420 X |
| 3,131,142 | 4/1964 | Mills | 208/108 |
| 3,161,585 | 12/1964 | Gleim et al. | 208/264 |
| 3,657,111 | 4/1972 | Gleim | 208/215 X |
| 4,125,455 | 11/1978 | Herbstman | 208/215 X |

Primary Examiner—W. J. Shine
Attorney, Agent, or Firm—Marthe L. Gibbons

[57] ABSTRACT

A catalyst comprising a composition comprising a catalytic metal component, carbon and hydrogen deposited on a low surface area metal or metal alloy support is provided. Hydrocarbon treating and conversion processes utilizing the catalyst are also provided. The catalyst is particularly suitable for slurry processes.

20 Claims, No Drawings

CATALYSTS HYDROCARBON TREATING PROCESSES

CROSS-REFERENCE TO RELATED APPLICATIONS

This application is a continuation-in-part of U.S. patent application Ser. No. 955,526 filed Oct. 30, 1978, which is a continuation-in-part of U.S. patent application Ser. No. 847,898, filed Nov. 2, 1977 (now U.S. Pat. No. 4,134,825), the teachings of both of which are hereby incorporated by specific reference.

BACKGROUND OF THE INVENTION

1. Field of the Invention

This invention relates to a catalyst, a method of preparing the catalyst and its use in hydrocarbon treating and conversion processes.

2. Description of the Prior Art

Catalysts prepared in situ in a hydrocarbonaceous oil from an oil soluble metal compound and their use in hydroconversion processes are disclosed in U.S. Pat. No. 4,134,825.

It is also shown to convert simultaneously a mixture of a hydrocarbonaceous oil and coal in the presence of hydrogen and a catalyst. See, for example, U.S. Pat. No. 4,054,504.

Alloy-skeleton metal sulfide hydrogenation catalysts that are corrosion resistant are known. See, U.S. Pat. No. 2,402,626.

Other alloy catalysts are also known. See, for example, U.S. Pat. Nos. 3,519,575; 3,052,739; 3,962,139; 3,147,154 and 3,455,845.

A highly dispersed alloy material of high surface area and their sulfides useful as hydrocracking catalysts are known. See, U.S. Pat. No. 3,639,647.

Ferromagnetic catalyst supports are known. See Ind. Eng. Chem. Process, Vol. 15, No. 1, 1976, pp. 226–227.

In slurry hydroconversion processes, catalyst recovery from the hydroconverted products is difficult. The use of a high density metal or metal alloy as catalyst support would improve recovery of the catalyst due to the high density of the material and/or its magnetic properties.

Except for catalytic metals and metal compounds that were used unsupported, it was generally considered desirable to composite catalytic metal compounds with a high surface area support for use as catalysts. In contrast, the catalyst of the present invention comprise a catalytic metal-carbon-hydrogen composition deposited on a low surface area support which provides a means of catalyst dispersion and facilitates catalyst recovery. The metal-containing deposit or coating provides the high surface area or "extended" catalyst surface for the desired catalytic reactions.

SUMMARY OF THE INVENTION

In accordance with the invention, there is provided a catalyst comprising a composition comprising a metal component, carbon and hydrogen deposited on a support selected from the group consisting of solid metals and metal alloys of metals of Groups IB, II, III, IV, VB, VIB, VIIB, VIII and mixtures thereof of the Periodic Table of Elements, said support having a surface area of less than about 5 square meters per gram and the metal constituent of said metal component of said composition being selected from the group consisting of metals of Groups II, III, IV, V, VIB, VIIB, VIII and mixtures thereof of the Periodic Table of Elements, and said composition having a surface area of at least about 50 $m^2/g$.

Furthermore, in accordance with the invention, there is also provided a method of preparing the catalyst and its use in hydrocarbon treating and conversion processes.

DETAILED DESCRIPTION OF THE INVENTION

The Catalyst

The catalyst of the present invention comprises a composition comprising catalytically active metal component, carbon and hydrogen deposited on finely divided support particles of a metal or a metal alloy.

Suitable supports are elemental metals and metal alloys which remain solid under process conditions and which have a low surface area and low pore volume, that is, a surface area of less than 5 square meters per gram, preferably less than 1 square meter per gram, more preferably less than 0.5 square meter per gram and a pore volume of less than about 0.1 cubic centimeter per gram.

The surface area referred to herein is in accordance with the method of Brunauer, Emmet and Teller (BET) *J. American Chem. Soc.*, Vol. 60 (1938), pp. 309–319.

The pore volume referred to herein is measured by nitrogen adsorption isotherm as described in *Analytical Chemistry*, Vol. 32, April, 1960; pp. 532–536. Suitable supports include metals and metal alloys of metals of Groups IB, II, III, IV, VB, VIB, VIIB, VIII and mixtures thereof of the Periodic Table of Elements.

The Periodic Table of Elements referred to herein is given in *Handbook of Chemistry and Physics* published by Chemical Rubber Publishing Co., Cleveland, Ohio, 45th Edition (1964).

Preferably, the support comprises at least one metal of the group consisting of iron, cobalt, nickel, chromium, molybdenum, tungsten, vanadium, zinc, tantalum, aluminum, copper and zirconium. More preferably, the support comprises iron. A preferred metal alloy comprises iron and at least one metal selected from the group consisting of chromium, molybdenum, tungsten and vanadium.

More preferably, the metals or alloys are chosen from those that are resistant to corrosion by oxygen or sulfur. Metals or metal alloys having paramagnetic properties and ferromagnetic properties are particularly preferred since the magnetic properties of the support facilitate recovery of the catalyst by magnetic separation processes. Ferromagnetic alloys are commercially available, for example, grades 410 and 434 of stainless steel. The given grades of stainless steel are in accordance to the designation of American Iron and Steel Institute (see *Lange's Handbook of Chemistry*, Handbook Publisher, Inc., Sandusky, Ohio, 1952, p. 840).

Suitable metal components of the composition that is deposited on the support are catalytically active components of metals of Groups II, III, IV, V, VIB, VIIB, VIII and mixtures thereof. Preferably the metal component is a component of vanadium, tungsten, molybdenum, nickel, cobalt, iron and mixtures thereof.

Suitable concentration of the metal component on the support includes from about 0.01 to about 10.0 weight percent, preferably from about 0.1 to about 5 weight percent, most preferably from about 0.5 to about 2.0 weight percent, calculated as the elemental metal, based on the total catalyst.

The high surface area supported catalysts of the present invention are made by utilizing a hydrocarbonaceous oil boiling at atmospheric pressure above about 221° C., preferably above about 260° C., more preferably above about 343° C. These hydrocarbon oils may be derived from any source such as petroleum, oil shale, tar sands and oils derived from coal liquefaction processes. The Conradson carbon residue of these oils will generally range up to about 50 weight percent, preferably below about 30 weight percent (as to Conradson carbon residue, see ASTM test D-189-65).

By way of example, suitable hydrocarbon oils for the process of the present invention include virgin gas oil, vacuum gas oil, coker gas oil, visbreaker gas oil, petroleum distillates, white oils, hydrocarbon oils derived from coal liquefaction processes, coal liquefaction bottoms, synthetic polymer oils such as ethylene oligomers, synthetic and natural waxes, etc. Preferably, the oil is a mixture of hydrocarbons boiling at atmospheric pressure, in the range of about 343° to 565° C. More preferably, the hydrocarbon chargestock comprises at least 50 percent of the Conradson carbon in the form of a hydrocarbon stream comprising more than 1 weight percent Conradson carbon residue, such as residua, whole crudes, etc.

To the hydrocarbon oil are added the support of the present invention and a thermally decomposable metal compound, wherein the metal constituent is selected from the group consisting of Groups, II, III, IV, V, VIB, VIIB, VIII and mixtures thereof of the Periodic Table of Elements. A sufficient amount of a single thermally decomposable metal compound or of a mixture of metal compounds is added to the oil to provide a ratio of atoms of Conradson carbon of the oil chargestock to atom of metal constituent of the thermally decomposable compound or compounds of less than about 750 to 1, preferably less than about 600 to 1, more preferably less than 100 to 1. Suitable ranges of ratio of atoms of Conradson carbon of the oil to atom of metal constituent of the thermally decomposable metal compound include an atomic ratio ranging from about 2 to 1 to about 600 to 1, preferably from about 2 to 1 to about 300 to 1, more preferably from about 4 to 1 to about 100 to 1. Thus the amount of thermally decomposable metal compound added will vary depending on the Conradson carbon of the oil feed actually used so as to provide the ratio required to obtain high surface area catalytic solids.

By the expression "ratio of atoms of Conradson carbon of the oil chargestock to atoms of metal constituent" is intended herein the following relation:

$$\frac{\frac{\text{weight of Conradson carbon residue}}{12}}{\frac{\text{weight of the metal constituent of the thermally decomposable compound}}{\text{atomic weight of the metal}}}$$

Suitable thermally decomposable metal compounds convertible (under preparation conditions) to solid, high surface area deposit include (1) inorganic metal compounds such as carbonyls, halides, oxyhalides; polyacids such as isopolyacids and heteropolyacids (e.g., phosphomolybdic acid, and molybdosilicic acid); (2) metal salts of organic acids such as acyclic and alicyclic aliphatic carboxylic acids and thiocarboxylic acids containing two or more carbon atoms (e.g., naphthenic acids); aromatic carboxylic acids (toluic acid); sulfonic acids (e.g., toluenesulfonic acid); sulfinic acid; mercaptans; xanthic acids; phenols, di- and polyhydroxy aromatic compounds; (3) organometallic compounds such as metal chelates, e.g., with 1,3-diketones, ethylenediamine, ethylenediaminetetraacetic acid, phthalocyanines, etc.; (4) metal salts of organic amines such as aliphatic amines, aromatic amines and quaternary ammonium compounds.

The metal constituent of the thermally decomposable metal compound that is convertible to a solid, high surface area deposit is selected from the group consisting of Groups II, III, IV, V, VIB, VIIB and VIII and mixtures thereof of the Periodic Table of Elements, that is, zinc, antimony, bismuth, titanium, cerium, vanadium, niobium, tantalum, chromium, molybdenum, tungsten, manganese, rhenium, iron, cobalt, nickel and the noble metals including platinum, iridium, palladium, osmium, ruthenium and rhodium. The preferred metal constituent of the thermally decomposable compound is selected from the group consisting of molybdenum, tungsten, vanadium, chromium, cobalt, titanium iron, nickel and mixtures thereof. Preferred compounds of the given metals include the salts of acyclic (straight or branched chain) aliphatic carboxylic acids, salts of alicyclic aliphatic carboxylic acids, heteropolyacids, carbonyls, phenolates and organoamine salts.

When the thermally decomposable metal compound is added to the hydrocarbonaceous oil, it first dissolves or disperses in the oil and subsequently, under catalyst preparation conditions herein described, is converted to a solid high surface area catalyst.

The oil comprising the thermally decomposable metal compound is heated at a temperature ranging from about 199° C. to about 571° C., preferably at a temperature ranging from about 260° C. to about 482° C., more preferably at a temperature ranging from about 316° C. to about 449° C., at a pressure of either atmospheric or superatmospheric, preferably at superatmospheric pressure in the presence of a gas selected from the group consisting of a hydrogen-containing gas, a hydrogen sulfide-containing gas, and a gas comprising hydrogen and hydrogen sulfide, preferably at least 50 psig of such gas. More preferably, the gas comprises hydrogen and hydrogen sulfide. The hydrogen sulfide may comprise from about 1 to 90 mole percent, more preferably from about 2 to 50 mole percent of the hydrogen-containing gas. Suitable total pressures in the catalyst preparation zone when the heating step is being conducted include a pressure ranging up to about 5000 psig, preferably a pressure ranging from about 100 to about 3000 psig. Suitable reaction times include from about 5 minutes to about 4 hours, preferably from about 10 minutes to 2 hours. Contact of the solution under catalyst preparation conditions in the reaction zone with the hydrogen sulfide-containing gas converts the metal compound to the corresponding metal catalyst. The oil containing the solids is removed from the catalyst preparation zone. The solids may be separated from the oil by conventional means, for example, by settling or centrifuging or filtration of the slurry. The recovered solids are the high surface area supported catalysts of the present invention. The surface area of coating or deposit on these catalysts will be at least about 50 m$^2$/g and range from about 60 to about 600 m$^2$/g, usually from about 100 to about 500 m$^2$/g. The total measured surface area of the supported catalyst (that is, deposit +- support) will be at least about 0.5 m$^2$/g, and range from about 0.5 to about 60 m$^2$/g, usually from about 1.0 to 30 m$^2$/g. Generally, the high surface area supported catalysts of the present invention comprise at least 0.01 to 10 weight percent, preferably above about 0.1 to 5 weight percent, more preferably from about 0.5 to about 2 weight percent of the metal constituent, calculated as elemental metal, corresponding to the metal constituent of the added thermally decomposable metal compound, said weight being based on the total high surface area catalyst. The catalyst of the present invention may be prepared either in a batch process or in a continuous type operation.

Alternatively, the high surface area composition comprising the metal-carbon-hydrogen may be preformed by utilizing the above-given thermally decomposable compounds, hydrocarbonaceous feed and preparation conditions except the omission of the low surface area support. The low surface area support is subsequently added to hydrocarbonaceous oil comprising the preformed high surface area composition or the preformed metal-carbon-hydrogen-containing composition is subsequently mixed with a hydrocarbonaceous oil of the same type as the oil suitable for the formation of the high surface area composition and with the low surface area support of the present invention. The mixture is heated at the same temperature and conditions used in the formation of the metal-carbon-hydrogen composition in the presence of a hydrogen-containing gas which may additionally comprise hydrogen sulfide for a time sufficient to deposit the metal-carbon-hydrogen composition on the low surface area support and thereby form a high surface area supported catalyst of the present invention.

The solids that are recovered from the reaction product of the catalyst preparation zone are suitable as catalysts, catalyst components or catalyst supports for use in a number of chemical processes and hydrocarbon treating and conversion processes such as catalytic cracking, hydrogenation, hydrogen refining, hydrodesulfurization, hydrocracking, reforming, etc., especially for hydroprocesses. The term "hydroprocess" is intended herein to mean a process conducted in the presence of hydrogen in which the hydrocarbonaceous oil feed is either upgraded (refined) without substantial change in the boiling range of the oil or a process in which the hydrocarbonaceous oil is converted to lower boiling hydrocarbon products.

The metal-carbon-hydrogen-coated support may be produced ex situ and added as a preformed metal component-carbon-hydrogen-coated support to the chargestock to be treated or the desired metal compound may be added to the hydrocarbonaceous oil chargestock containing the support and the decomposition of the metal compound may be made to occur in situ in the oil chargestock by heating the oil comprising the support and the metal compound to an elevated temperature while adding a hydrogen-containing gas or a hydrogen and hydrogen sulfide-containing gas to the mixture.

The catalyst of the present invention may be used in a slurry process, in a fluidized bed process, in a fixed bed process, in a moving bed process, in an ebullating bed process, etc.

It is particularly suited for use in slurry processes since recovery of the catalyst could be performed by gravity separation, magnetic filtration or a combination of both of these methods.

The particle size of the catalyst may suitably range from about 0.5 micron to about 150 microns in diameter, preferably from about 1 to about 50 microns, most preferably from about 1 to about 10 microns in diameter. The smaller particle sizes will be preferred for slurry type processes whereas particle sizes above 100 microns in diameter would be suitable for fluidized bed type processes.

The catalysts of the present invention are suitable for use in hydrocarbon treating processes. The catalysts are particularly suited for hydroconversion of hydrocarbonaceous oils and coal.

The operating conditions to be employed in the hydrocarbon treating processes are well known and will vary with the particular reaction desired. The following table summarizes typical reaction conditions in which the catalysts of the present invention can be utilized.

| Principal Reaction Desired | Temperature, °C. | Pressure, psig | Feed Rate V/V/Hr | Hydrogen Rate SCF/bbl |
|---|---|---|---|---|
| Hydrorefining | 260–427 | 50–2000 | 0.1–10 | 500–10,000 |
| Hydrodesulfurization | 316–455 | 600–3500 | 0.05–5 | 300–20,000 |
| Hydrocracking | 232–510 | 200–2000 | 0.1–10 | 500–10,000 |
| Catalytic Cracking | 371–705 | 0–50 | 0.1–20 | 0 |
| Catalytic Reforming | 454–538 | 50–1000 | 0.1–20.0 | 500–10,000 |

The feedstocks suitable for the treating process in accordance with the invention include any of the well known feeds conventionally employed in the desired treating processes. Suitable feedstocks for the hydrocarbon treating processes of the present invention include hydrocarbonaceous oils derived from any source such as petroleum, shale, tar sand, coal liquefaction processes, including coal liquefaction bottoms. Typically, such feeds include naphthas, gas oils, atmospheric residua, vacuum, residua, whole petroleum crude oils, including heavy crude oils, bitumen, etc.

To any of these hydrocarbonaceous oils may be added particulate coal when the process utilized is suitable for the simultaneous treatment of oil and coal.

The metal constituent or metal constituents of the coating or deposit of the present invention can be varied by using one or more initial thermally decomposable metal compounds which are subsequently thermally decomposed. Alternatively, the preformed coating or the total catalyst may be composited with other known catalytic components. Thus, a recovered high surface area composition or the total catalyst may be composited in a conventional manner with metal constituents that are known to catalyze a given process. The compositing of the catalyst with the additional catalytic agents may be performed by impregnating the preformed high surface area composition or total catalyst comprising one or more metal constituents with catalytic components or precursors in any conventional way, such as contact of the solids with a dissolved salt of the desired metal or metals or by a method such as disclosed in U.S. Pat. No. 3,959,179.

The compositing of the preformed high surface area composition or total catalyst may be performed by depositing a desired catalytic metal component or precursor of a catalytic metal component on the surface of the solids, including contacting of the solids with vapor phase materials. Furthermore, physical mixtures of two or more different preformed high surface area compositions or total catalysts may be used in certain processes, for example, a recovered catalyst having one or more metal constituents which is different from another recovered catalyst wherein different initial thermally decomposable metal compounds were used.

The catalyst of the present invention may be used in a moving bed, fixed bed, fluidized bed, ebullating bed, suspension (transferline) or in slurry processes.

PREFERRED EMBODIMENTS

The following examples are presented to illustrate the invention.

EXAMPLE 1—Preparation of catalyst comprising molybdenum-carbon-hydrogen composition coated on 410 stainless steel powder (Runs 476, 477)

A mixture consisting of 8.0 g of molybdenum naphthenate (6.0 weight percent molybdenum), 92 g of light Arab vacuum gas oil and 12.50 g of −325 mesh 410 stainless steel was charged to a 300 cc autoclave, which was pressured with 2000 psig hydrogen at room temperature, heated to 316° C. and held for one hour with stirring. The autoclave was cooled below 93.33° C. and vented while further cooling to room temperature. The autoclave was then pressured with 100 psig of $H_2S$ and then to 2100 psig with hydrogen, after which it was heated at 399° C. for two hours. After cooling, the autoclave was vented and the contents filtered. The solids were thoroughly washed with hot toluene followed by hot heptane and then dried in a vacuum oven at 90° C. for 1 hour.

The recovered solids, which are supported catalysts in accordance with the present invention, weighed 13.93 g and had the following properties: pore volume, 0.13 cc/g; total surface area, 21.5 m$^2$/g; carbon, 0.95 weight percent; hydrogen, 0.15 weight percent.

The weight percent of coating with molybdenum calculated as $MoS_2$ based on the total catalyst was 6.85 weight percent.

The surface area of the stainless steel powder was determined to be 0.09 m$^2$/g and the pore volume, 0.01 cc/g. From this determination and the analyses of the supported catalyst, it was calculated that the surface area of the coating was 254 m$^2$/g and the pore volume was 1.31 cc/g.

EXAMPLE 2—Preparation of catalyst comprising molybdenum-carbon-hydrogen composition coated on 410 stainless steel (Run 470)

A preparation similar to that described in Example 1 was performed except that 50.0 g of 410 stainless steel powder was added. The recovered solids, which were supported catalysts in accordance with the present invention, weighed 53.28 g and had the following properties: pore volume, 0.02 cc/g; total surface area, 2.63 m$^2$/g; carbon, 0.35 weight percent; hydrogen, 0.06 weight percent.

Electron photomicrographs showed that the catalyst comprised the high surface area molybdenum-carbon-hydrogen composition of Example 3 coated on the stainless steel support. The weight percent Mo-C-H coating, with Mo calculated as $MoS_2$, was 1.92 weight percent based on the weight of 410 stainless steel charged.

From the analyses, it was calculated that the coating had a surface area of 133 m$^2$/g and a pore volume of 0.52 cc/g.

EXAMPLE 3—Preparation of unsupported high surface area molybdenum-hydrogen-carbon composition (Runs 471, 472)

This is not an example of a catalyst of the invention.

A preparation similar to the one described in Example 1 was performed except that the 410 stainless steel powder was not added. The weight of the recovered solids was 0.96 g.

This preparation was repeated, and the two solids were combined for analyses and testing. The solids, which are not in accordance with the supported catalyst of the present invention, had the following properties: pore volume, 2.17 cc/g; surface area, 272 m$^2$/g; carbon, 10.07 weight percent; hydrogen, 1.24 weight percent; molybdenum, 50 weight percent.

Electron photomicrographs showed that the unsupported catalyst comprises rough, irregular particles of 10 to 250 microns in size.

EXAMPLE 4—Preparation of catalyst comprising molybdenum-carbon-hydrogen coated on 410 stainless steel powder starting with dispersion of 410 stainless steel and alcoholic phosphomolybdic acid in gas oil (Run 56-R-41).

A solution of 1.02 g of phosphomolybdic acid ($2H_3PO_4.20MoO_3.48H_2O$) in 4.48 g of anhydrous isopropyl alcohol and 92.78 g of light Arab vacuum gas oil was charged to a 300 cc autoclave along with 50.02 g of −325 mesh (Tyler) 410 stainless steel powder. A gas charge comprising 100 psig $H_2S$ and 1900 psig hydrogen was added at room temperature, and the autoclave was then heated to 399° C. and held at this temperature with stirring for a period of two hours. Upon cooling below 93.33° C., the autoclave was vented and the gases were measured and collected for compositional analysis by mass spectrometry. The contents of the autoclave were filtered to recover the molybdenum-carbon-hydrogen coated alloy catalyst, which was washed with hot toluene followed by hot n-heptane to remove adhering oil, and then vacuum oven dried for 30 minutes at 90° C. The supported catalytic solids that were recovered weighed 51.10 grams and are catalysts in accordance with the present invention. The filtered gas oil product was analyzed for sulfur content so that a first cycle hydrodesulfurization activity of the catalyst could be evaluated. Product sulfur measured 0.764 weight percent compared to 2.4 weight percent sulfur for the gas oil feed.

EXAMPLE 5—Preparation of catalysts comprising molybdenum coated on 410 stainless steel starting with phosphomolybdic acid impregnated 410 stainless steel dispersed in gas oil (Run 56-R-75).

This is not an example of a catalyst in accordance with the present invention.

A solution of 1.0 g of phosphomolybdic acid (PMA) in 9.0 g of anhydrous isopropyl alcohol was added dropwise with stirring to 50 g of stainless steel powder. The 10 g of solution was just sufficient to wet the powder. The mixture was then vacuum oven dried at 90° C. for one hour to produce 50.66 g of dry, phosphomolybdic acid coated 410 stainless steel powder.

The dry powder and 96.19 g of light Arab vacuum gas oil were charged to a 300 cc autoclave, which was pressured to 100 psig with $H_2S$ and then up to 2000 psig with hydrogen. After a stirred, two-hour contact at 399° C., the autoclave was cooled, vented and the contents filtered to recover the molybdenum coated catalyst. Washed free of adhering oil and vacuum oven dried, the catalyst was found to weigh 52.10 g. It is not a catalyst of the present invention.

The filtered product oil was found to contain 1.53 weight percent sulfur. This is considerably higher than that obtained for the product oil in Example 4.

Therefore, it can be seen that impregnating the molybdenum component on the metal alloy support prior to decomposition in gas oil gave an inferior catalyst relative to that obtained by dispersing the metal component (catalyst precursor) in gas oil and then conducting the decomposition in the presence of the alloy support (as described in Example 4).

EXAMPLE 6—Preparation of unsupported high surface area molybdenum-carbon-hydrogen composition (Run 56-R-47)

A 300 cc autoclave containing a mixture of 8.10 g of molybdenum naphthenate and 92.5 g of vacuum gas oil was charged with 100 psig $H_2S$ and 1900 psig hydrogen at room temperature. The autoclave was heated to 399° C. and held for two hours with stirring. Upon cooling below 93.33° C., the autoclave pressure was released and the contents were filtered to recover a molybdenum-carbon-hydrogen solid composition. After washing with hot toluene followed by hot n-heptane, the solids were vacuum dried at 90° C. for 30 minutes. There were recovered 1.0 g of molybdenum-carbon-hydrogen composition identical in appearance to that obtained in Example 3 (which was obtained by a slightly different procedure).

EXAMPLE 7—Gas oil desulfurization with unsupported catalyst of Example 6 (Run 46-R-48)

Example 7 is not an example of the catalyst of the invention.

The high surface area molybdenum-carbon-hydrogen composition from Example 6 was charged to a 300 cc autoclave along with 92.27 g of fresh, light Arab vacuum gas oil. A gas charge comprising 100 psig $H_2S$ and 1950 psig $H_2$ was added at room temperature, and the autoclave was then heated to 385° C. for a 30-minute stirred contact followed by 40 minutes at 449° C. Upon cooling below 93.33° C., the autoclave gases were vented off, measured, and collected for analysis of composition by mass spectrometry. The autoclave contents were filtered to recover an unsupported catalyst comprising molybdenum, carbon and hydrogen and a product oil. The product oil was found to contain 0.38 weight percent sulfur. Overall, the desulfurization of the oil feed amounted to 84 weight percent.

EXAMPLE 8—Preparation of supported molybdenum-carbon-hydrogen-containing composition from a mixture of preformed molybdenum-carbon-hydrogen composition and 410 stainless steel powder (Run 56-R-49).

A mixture consisting of 0.8 g of unsupported high surface area molybdenum-carbon-hydrogen composition recovered from Example 7, 50.0 g of −325 mesh (Tyler) 410 stainless steel powder and 93.57 g of light Arab vacuum gas oil was charged to a 300 cc autoclave. A gas charge comprising 100 psig $H_2S$ and 1950 psig $H_2$ was added at room temperature and the autoclave was then heated to 385° C. for a 30-minute stirred contact followed by a contact of 40 minutes at 449° C. Upon cooling below 93.33° C., the autoclave gases were vented off, measured, and collected for analysis of composition by mass spectrometry. The contents of the autoclave were filtered to recover the molybdenum-containing catalyst and a product oil. After washing sequentially with hot toluene and hot n-heptane, the solids were vacuum dried at 90° C. for 30 minutes. There were recovered 53.82 g of catalyst solids which were (1) identical in appearance to the molybdenum-carbon-hydrogen coated catalysts of Examples 1, 2 and 4; (2) free of any of the characteristically fluffy unsupported molybdenum-carbon-hydrogen composition; and (3) ferromagnetic, i.e., all of the solids were attracted by a magnet. The sulfur in the oil product, 0.34 weight percent, was somewhat lower than that seen in Example 7. This shows that the hydrodesulfurization activity of the catalyst was not lost by preparing it by combining the molybdenum-carbon-hydrogen composition with the 410 stainless steel powder. The supported catalysts resulting from Example 8 is a catalyst in accordance with the present invention.

EXAMPLE 9—Gas Oil Desulfurization with the supported catalyst of Example 8 (Run 56-R-52)

The gas oil desulfurization test used in Example 7 was repeated using the catalyst of the present invention recovered from Example 8. The sulfur in the oil product was 0.38 weight percent, which is identical to that obtained from the unsupported catalyst comprising molybdenum-carbon-hydrogen of Example 7. The results show that the molybdenum-carbon-hydrogen composition continues to exhibit its full activity after being supported on 410 stainless steel powder.

The following Tables I to III summarize some of the data of the above-given examples.

TABLE I

| Sample Source | 410-SS[1] | Mo on 410-SS[1] Example 1 | Mo on 410-SS[1] Example 2 | Unsupported Mo-Catalyst Example 3 |
|---|---|---|---|---|
| Composition, Wt. % | | | | |
| 410-SS[1] | 100 | 89.73 | 93.84 | — |
| Mo as $MoS_2$ | | 5.75 | 1.51 | 80 |
| Balance (S,C,H) | | 4.53 | 4.66 | 20 |
| Inspections | | | | |
| S.A. $m^2/g$ | 0.09 | 21.5 | 2.63 | 272 |
| P.V. $cm^3/g$ | 0.01 | 0.13 | 0.02 | 2.17 |
| Properties of Mo—C—H coating[2] | | | | |
| S.A. $m^2/g$ | — | 254 | 133 | 272 |

TABLE I-continued

| Sample Source | 410-SS[1] | Mo on 410-SS[1] Example 1 | Mo on 410-SS[1] Example 2 | Unsupported Mo-Catalyst Example 3 |
|---|---|---|---|---|
| P.V. cm$^3$/g | — | 1.31 | .52 | 2.17 |

[1]410-SS means 410 Stainless Steel
[2]Calculated Properties for Examples 1 and 2

TABLE II

Catalysts: Mo—C—H Coated on 410-Stainless Steel
Effect of Preparation Technique
on Hydrodesulfurization Activity

| Example No. | 4 | 5 |
|---|---|---|
| Type Precursor | PMA* dry coated on alloy | Mixture of alloy and alcohol solution of PMA* |
| Desulfurization of oil, % | 36 | 87 |

*PMA is Phosphomolybdic Acid

TABLE III

Comparison of High Surface Area Molybdenum—
Carbon—Hydrogen Composition Before and After
Supporting on 410-SS[1]
(Vacuum Gas Oil Hydrodesulfurization)

| Example No. | 7 | 9 |
|---|---|---|
| Type Preparation | Unsupported Molybdenum—C—H Composition | 410-SS[1] powder coated with Molybdenum—C—H Composition of Example 7 |
| Vacuum Gas Oil desulfurization, % | 84 | 84 |

[1]410-SS is 410 Stainless Steel

EXAMPLE 10—A catalyst comprising a composition of molybdenum sulfide-carbon-hydrogen deposited on stainless steel was prepared by charging a 300 cc Hastelloy-C autoclave with 91.1 grams of light Arabian vacuum gas oil, 3.4 grams of oil soluble molybdenum naphthenate (6% molybdenum) and 50 grams of finely divided stainless steel of the grade 410 series.

Hastelloy-C is a trademark of Haynes Stellite Co., Kohomo, Ind. (see *Chemical Engineering Handbook*, McGraw Hill, 1934 edited by Perry). The stainless steel was ferromagnetic. Particle size distribution of the 410 stainless steel was 99.9% less than 30 microns, 96.7% less than 20 microns and 54.2% less than 10 microns. The reactor was flushed with hydrogen after charging and then pressured to 25 psig with hydrogen sulfide and then to 2000 psig with hydrogen. The reactor temperature was increased to 300° C. with stirring and held there for 120 minutes. Thereafter, the reactor was cooled quickly and the contents discharged. The stainless steel on which the metal sulfide-containing composition was deposited was recovered by filtration, washed free of adhering oil with toluene and vacuum dried at 80° C. to constant weight. In this manner, 51.94 grams of catalyst which was still strongly ferromagnetic were recovered. This recovered catalyst gave the following analyses: molybdenum, 0.39 weight percent; carbon, 0.41 weight percent; hydrogen, 0.07 weight percent.

Analysis of the oil medium showed a molybdenum concentration of <1 ppm, thus further demonstrating that the molybdenum was associated with the 410 stainless steel particles.

The conversion advantages obtained using the MoS$_2$-carbon-hydrogen deposited on 410 stainless steel as catalyst in the hydrocracking of Cold Lake Crude, relative to 410 stainless steel alone and to a non-catalytic system are shown in Table IV.

TABLE IV

Hydrocracking Of Cold Lake Crude
Conditions:
2000 + psig H$_2$
30 min @ 385° C.
60 min @ 438–443° C.
Catalyst conc. on feed 40 wt. %.

| Run No. | 6R-34 | 21-R-05* | 21-R-08 |
|---|---|---|---|
| Catalyst | None | Catalyst of Example 10 | 410 SS |
| C$_1$-C$_4$, wt. % | 6.5 | 2.5 | — |
| Coke, wt. % | 5.5 | 0.8 | ≈3 |
| Desulfurization, % | 35 | 52 | 54 |
| V removal, % | 72 | 91 | 79 |
| Ni removal, % | 70 | 83 | 82 |
| Con. carbon conv., % | 47 | 54 | 54 |

*Molybdenum concentration in oil recovered by magnetic filtration was <1 ppm.

It should be noted that run 6R-34 is a comparative run with no catalyst and run 21-R-08 is a comparative run with stainless steel alone. Run 21-R-05 (catalyst of example 10, molybdenum sulfide-carbon-hydrogen on stainless steel) is a run utilizing the catalyst of the present invention. It should be noted that molybdenum sulfide-carbon-hydrogen deposited on stainless steel as catalyst was better than the run utilizing the stainless steel alone as catalyst, particularly for suppressing the formation of coke.

EXAMPLE 11

The conversion advantages obtained using molybdenum sulfide-carbon-hydrogen surface coated 410 stainless steel (Example 10) as catalyst in the hydrocracking of light Arabian vacuum gas oil, relative to 410 stainless steel alone are shown in Table V.

TABLE V

Vacuum Gas Oil Hydrocracking Runs

| Reactor Charge @ room temp: | 92 g. vacuum gas oil ~50 g. catalyst ~1.15 mole H$_2$ ~0.06 mole H$_2$S | |
|---|---|---|
| Reaction Conditions: | 30 min. @ 385° C. followed by 30 min. @ 449° C. | |
| Run No. | 56-R-05 | 34-R-71 |
| Catalyst | −325 mesh 410 SS[1] | MoS$_2$-on-410 SS[1] (−325 mesh) |
| C$_1$-C$_4$ yield, wt. % on feed | 2.0 | 2.6 |
| 650+°F. Conversion, % | 39 | 38 |
| Distillate/Naphtha wt. ratio | 3.0 | 3.7 |
| Desulfurization, wt. % | 67 | 79 |
| Bromine Number | 12.5 | 9.4 |

[1]410 SS means 410 Stainless Steel

It should be noted that improved desulfurization and product Bromine Number (measure of unsaturation)

were obtained using the molybdenum sulfide-carbon-hydrogen coated alloy. In addition, the coated alloy catalyst provided a higher ratio of distillate to naphtha products than that obtained with the 410 stainless steel alloy alone. This is a desirable selectivity characteristic for most vacuum gas oil hydrocracking uses.

What is claimed is:

1. A catalyst comprising a composition comprising a metal component, carbon and hydrogen deposited on a support selected from the group consisting of solid metals and metal alloys of metals of Groups IB, II, III, IV, VB, VIB, VIIB, VIII and mixtures thereof of the Periodic Table of Elements, said support having a surface area of less than about 5 square meters per gram, and the metal constituent of said metal component of said composition being selected from the group consisting of metals of Groups II, III, IV, V, VIB, VIIB, VIII and mixtures thereof of the Periodic Table of Elements, said composition having a surface area of at least about 50 m$^2$/g, said catalyst having been prepared by the steps which comprise:
   (a) dispersing in a hydrocarbon oil having a Conradson carbon content up to about 50 weight percent,
      (1) a thermally decomposable metal compound in an amount sufficient to provide a ratio of atoms of oil Conradson carbon to atom of metal constituent of said thermally decomposable compound of less than about 750 to 1, said metal constituent being selected from the group consisting of Group II, Group III, Group IV, Group V, Group VIB, Group VIIB, and Group VIII of the Periodic Table of Elements and mixtures thereof, and (2) said support;
   (b) heating the resulting mixture in the presence of a gas selected from the group consisting of a hydrogen-containing gas, a hydrogen sulfide-containing gas and a gas comprising hydrogen and hydrogen sulfide, and
   (c) recovering a supported catalyst.

2. The catalyst of claim 1 wherein said metal component of said composition, calculated as the elemental metal, comprises from about 0.01 to about 10 weight percent of said catalyst.

3. The catalyst of claim 1 wherein said support comprises at least one metal selected from the group consisting of iron, cobalt, nickel, chromium, molybdenum, tungsten, vanadium, zinc, tantalum, aluminum, copper and zirconium.

4. The catalyst of claim 1 wherein said support comprises iron.

5. The catalyst of claim 1 wherein said support is a metal alloy and wherein said alloy comprises iron and at least one metal selected from the group consisting of chromium, molybdenum, tungsten and vanadium.

6. The catalyst of claim 1 wherein said support is ferromagnetic.

7. The catalyst of claim 1 wherein said metal component of said composition is selected from the group consisting of vanadium component, tungsten component, molybdenum component, nickel component, cobalt component, iron component and mixtures thereof.

8. The catalyst of claim 1 wherein said catalyst has a size ranging from about 0.5 micron to about 150 microns in diameter.

9. A process for the preparation of a supported catalyst which comprises the steps of:
   (a) dispersing in a hydrocarbon oil having a Conradson carbon content up to about 50 weight percent,
      (1) a thermally decomposable metal compound in an amount sufficient to provide a ratio of atoms of oil Conradson carbon to atoms of metal constituent of said thermally decomposable compound of less than about 750 to 1, said metal constituent being selected from the group consisting of Group II, Group III, Group IV, Group V, Group VIB, Group VIIB and Group VIII of the Periodic Table of Elements and mixtures thereof and (2) a support selected from the group consisting of metal and metal alloys of Group IB, II, III, IV, VB, VIB, VIIB, VIII and mixtures thereof of the Periodic Table of Elements, said support having a surface area of less than about 5 square meters per gram;
   (b) heating the resulting mixture in the presence of a gas selected from the group consisting of a hydrogen-containing gas, a hydrogen sulfide-containing gas, and a gas comprising hydrogen and hydrogen sulfide, to produce a composition having at least 50 m$^2$/g deposited on said support; and
   (c) recovering a supported catalyst.

10. The process of claim 9 wherein said support comprises at least one metal selected from the group consisting of iron, cobalt, nickel, chromium, molybdenum, tungsten, vanadium, zinc, tantalum, aluminum, copper and zirconium.

11. The process of claim 9 wherein said support comprises iron.

12. The process of claim 9 wherein said support is a metal alloy and wherein said alloy comprises iron and at least one metal selected from the group consisting of chromium, molybdenum, tungsten and vanadium.

13. The process of claim 9 wherein said support is ferromagnetic.

14. The process of claim 9 wherein said thermally decomposable metal compound is selected from the group consisting of inorganic metal compounds, salts of organic acids, organometallic compounds and salts of organic amines.

15. The process of claim 9 wherein said thermally decomposable metal compound is a salt of a naphthenic acid.

16. The process of claim 9 wherein said thermally decomposable metal compound is phosphomolybdic acid.

17. The process of claim 9 wherein said metal constituent of said thermally decomposable metal compound is selected from the group consisting of vanadium, tungsten, molybdenum, nickel, cobalt, iron and mixtures thereof.

18. The process of claim 9 wherein said support has a surface area of less than about 1 square meter per gram.

19. The process of claim 9 wherein said heating of step (b) is conducted at a temperature ranging from about 199° C. to 571° C.

20. A process for the preparation of a supported catalyst which comprises the steps of:
   (a) dispersing in a hydrocarbon oil having a Conradson carbon content up to about 50 weight percent, a thermally decomposable metal compound in an amount sufficient to provide a ratio of atoms of oil Conradson carbon to atoms of metal constituent of said thermally decomposable compound of less than about 750 to 1, said metal constituent being selected from the group consisting of Group II, Group III, Group IV, Group V, Group VIB, Group VIIB, Group VIII of the Periodic Table of Elements and mixtures thereof;

(b) heating the resulting mixture in the presence of a gas selected from the group consisting of a hydrogen-containing gas, a hydrogen sulfide-containing gas, and a gas comprising hydrogen and hydrogen sulfide, to form a catalytic composition comprising a metal component, carbon and hydrogen;

(c) contacting the resulting composition with a support selected from the group consisting of Group IB, Group II, Group III, Group IV, Group V, Group VIB, Group VIIB, and Group VIII of the periodic Table of Elements, said support having a surface area of less than about 5 square meters per gram, in the presence of a hydrocarbon oil having a Conradson carbon content up to about 50 weight percent;

(d) heating the resulting mixture in the presence of a gas selected from the group consisting of hydrogen-containing gas, hydrogen sulfide-containing gas, and gas comprising hydrogen and hydrogen sulfide, for a time sufficient to deposit said composition on said support, said composition having a surface area of at least about 50 $m^2/g$, and (e) recovering a supported catalyst.

* * * * *